United States Patent [19]
Ohta et al.

[11] Patent Number: 5,328,256
[45] Date of Patent: Jul. 12, 1994

[54] ANTI-SKID BRAKE CONTROL DEVICE

[75] Inventors: Kenji Ohta; Shigeru Horikoski; Kousaku Shimada; Hayato Sugawara, all of Katsuta, Japan

[73] Assignees: Hitachi, Ltd., Tokyo; Hitachi Automotive Engineering Co. Ltd., Katsuta, both of Japan

[21] Appl. No.: 942,209

[22] Filed: Sep. 9, 1992

[30] Foreign Application Priority Data

Sep. 9, 1991 [JP] Japan .................. 3-227833

[51] Int. Cl.$^5$ .................................. B60T 8/58
[52] U.S. Cl. ......................... 303/11; 364/426.02
[58] Field of Search ............... 303/100, 110, 96, 103, 303/104, 105, 111; 364/426.02

[56] References Cited

U.S. PATENT DOCUMENTS

| 4,508,393 | 4/1985 | Drometer | 303/111 |
| 4,763,262 | 8/1988 | Leiber | 303/100 |
| 4,881,785 | 11/1989 | Ushijima et al. | 303/111 |
| 5,134,352 | 7/1992 | Matsumoto et al. | 303/92 |
| 5,172,961 | 12/1992 | Inoue et al. | 303/100 |

Primary Examiner—Matthew C. Graham
Attorney, Agent, or Firm—Antonelli, Terry, Stout & Kraus

[57] ABSTRACT

An anti-skid brake control device has a control circuit 6 to which signals from a steering angle sensor 14, a yaw detector 7 and respective wheel velocity sensors $3a \sim 3d$ of a motor vehicle are inputted, an oil pressure actuator 5 controls of the pressure of the braking fluid for respective wheel cylinders $2a \sim 2d$ based upon target slip rates Sfrt. Sflt, Srrt and Srlt and measured slip rates Sfr, Sfl, Srr and Srl for the respective wheels calculated in the control circuit 6. The target slip rates for the respective wheels, which are principally determined dependent upon the deviation $\beta$ between compensated target yaw angular acceleration $\dot{\omega}R$ and measured yaw angular acceleration $\dot{\omega}$, are set independently and are modified dependent upon the motor vehicle body velocity, whereby the braking forces for the respective wheels are independently controlled. In this way, it is possible to suppress generated yaw moment and to improve stability of the motor vehicle, while also safely reducing the braking distance.

3 Claims, 6 Drawing Sheets

MAP IN 307

ANTI-SKID BRAKE CONTROL DEVICE

BACKGROUND OF THE INVENTION

1. Field of the Invention

The present invention relates to an anti-skid brake control device for a motor vehicle.

2. Description of Related Art

As is well known, an anti-skid brake control (hereinbelow referred to as an ABS control) device is a device which is designed to prevent wheel lock even at the moment of sudden braking of a motor vehicle on a slippery road by temporarily reducing the braking pressure when the wheels are likely to lock and to stop the motor vehicle stably without losing control of the vehicle.

However, under such circumstance where the road surface conditions at the right and left sides of the motor vehicle are different, a difference between the braking forces acting on the wheels at the right side of the motor vehicle and those at the left side appears when control for maintaining an equal slip rate for the right and left side wheels of the motor vehicle is performed, with the result that a yaw moment which causes spinning of the motor vehicle around a vertical axis is generated by the braking force difference to render the motor vehicle unstable.

Under such circumstances, in a conventional ABS control device, a so-called select low control is performed in which the brake fluid pressures for wheels not likely to lock are matched to the brake pressure for a wheel likely to lock in order to improve the stability of the motor vehicle, however, such a solution results in a drawback that the braking distance of the motor vehicle increases due to the braking force decrease.

U.S. Pat. No. JP-A-1-208256(1989), for example, discloses one of the improvements ABS of the systems type above indicated in which the cornering force is increased on the one hand by reducing the target slip rate for the rear wheels under an unstable condition of a large yaw rate of the motor vehicle, and on the other hand by reducing the target slip rate for the front wheels under a condition of a poor steering effort.

However, the above ABS control device disclosed in U.S. Pat. No. JP-A-208256 sacrifies either the braking performance or the stability of the motor vehicle and can not achieve both at the same time.

Further, even under a control which places importance on stability of a motor vehicle, no measures were taken positively to cancel out the braking force difference of the right and left wheels on a so called split μ road in which the road surface condition greatly differs at the right and left sides of the motor vehicle, and therefore a substantial stability of the motor vehicle could not be obtained even if the braking force difference between the right and left wheels could be reduced.

SUMMARY OF THE INVENTION

Accordingly, in view of the above mentioned problems in the prior art, an object of the present invention is to provide an anti-skid brake control device which achieves a stability in the operation of a motor vehicle by positively canceling out a braking force difference between the right and left wheels even on a split μ road. A further object of the present invention is to provide an anti-skid brake control device which realizes both the stability and braking performance of a motor vehicle by minimizing the braking force reduction even when an insufficient braking force is caused for the achievement of stability of the motor vehicle.

The above objects of the present invention are realized by providing, in addition to the usual elements of the ABS control device, means for detecting yaw angular acceleration of a motor vehicle body and a target slip rate setting means for setting target slip rates for the right and left wheels independently, based upon the difference between the detected yaw angular acceleration and a target yaw angular acceleration determined in accordance with steering wheel steering speed, as well as for rendering the target slip rates for the right and left wheels variable.

A behavior of a motor vehicle equipped with the ABS control device according to the present invention when the brake thereof is actuated on a split μ road is explained hereinbelow. In the case when the ABS control is carried out on a split μ road, a difference between braking forces for the right and left wheels of the motor vehicle is induced and a yaw moment is produced on the motor vehicle. As a result, the front portion of the motor vehicle body tends to move to a high μ side having a high friction coefficient. This tendency is detected by the yaw angular acceleration detection means and based upon the difference between the detected yaw angular acceleration and the target yaw angular acceleration determined in accordance with the steering wheel steering speed, target slip rates for the respective wheels are obtained. In this instance, in order to cancel out the generated yaw moment through a reduction of the braking force for the wheels at the high μ side, the target slip rate for the wheels at the high μ side is reduced. The motor vehicle can be stopped stably even under a circumstance where the road surface condition at the right and left sides of the motor vehicle differs.

BRIEF DESCRIPTION OF THE DRAWINGS

FIG. 3 (*b*) is a map included in the control block 307 in the control circuit shown in FIG. 3 (*a*) ;

DESCRIPTION OF A PREFERRED EMBODIMENT

Figure 1:
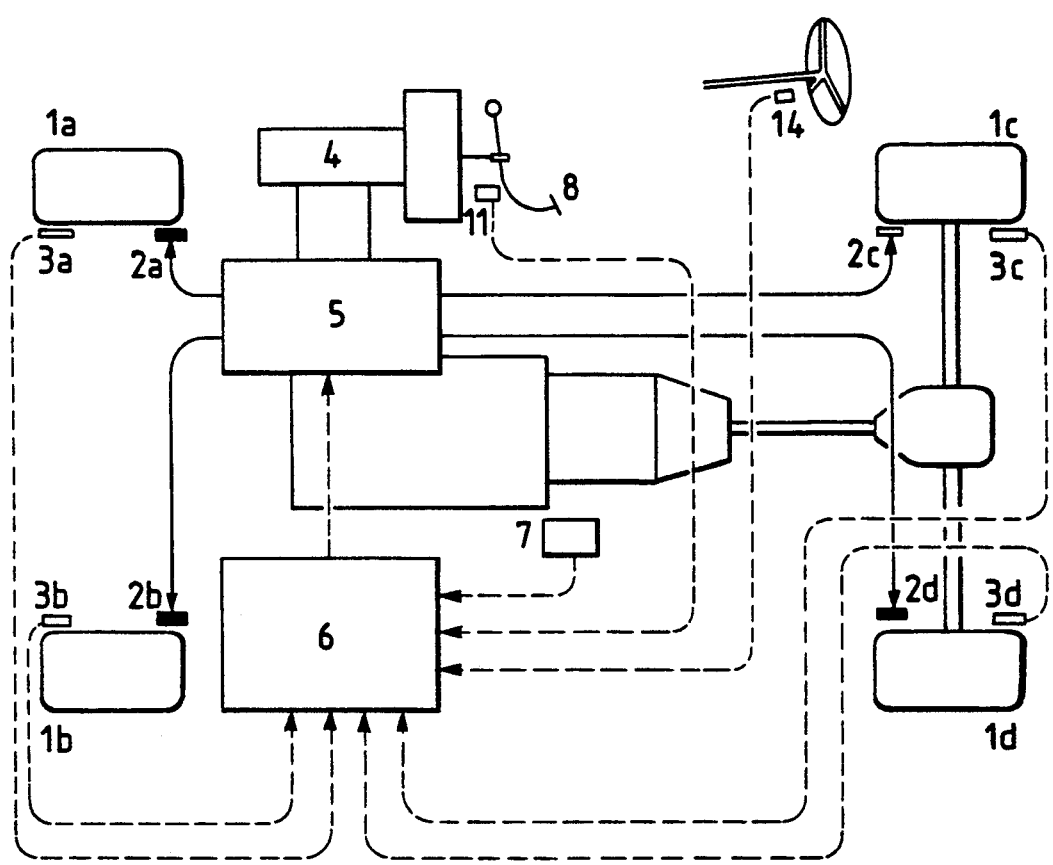
FIG. 1 is a block diagram showing the system constitution of one embodiment according to the present invention.

The present invention will be explained with reference to the drawings. FIG. 1 shows a system forming one embodiment of the present invention. As seen from the drawing, for respective wheels $1a \sim 1d$ respective wheel brake cylinders $2a \sim 2d$ and wheel speed sensors $3a \sim 3d$ are provided. The pressure generated in a master brake cylinder 4 through the actuation of a brake pedal 8 is transferred to the oil pressure unit 5 and then transmitted to the respective wheel brake cylinders $2a \sim 2d$ via the oil pressure unit 5 to thereby supply a pressure fluid to the respective wheel brake cylinders $2a \sim 2d$. The oil pressure unit 5 controls the pressure of the fluid for the respective wheel brake cylinders with signals from a control circuit 6. Further, in the drawing a yaw detector 7 which detects a yaw rate of the motor vehicle. The yaw detector 7 is constituted by making use of a device, such as a semiconductor strain gauge, and the output thereof representing a yaw rate is inputted to the control circuit 6.

Figure 2:
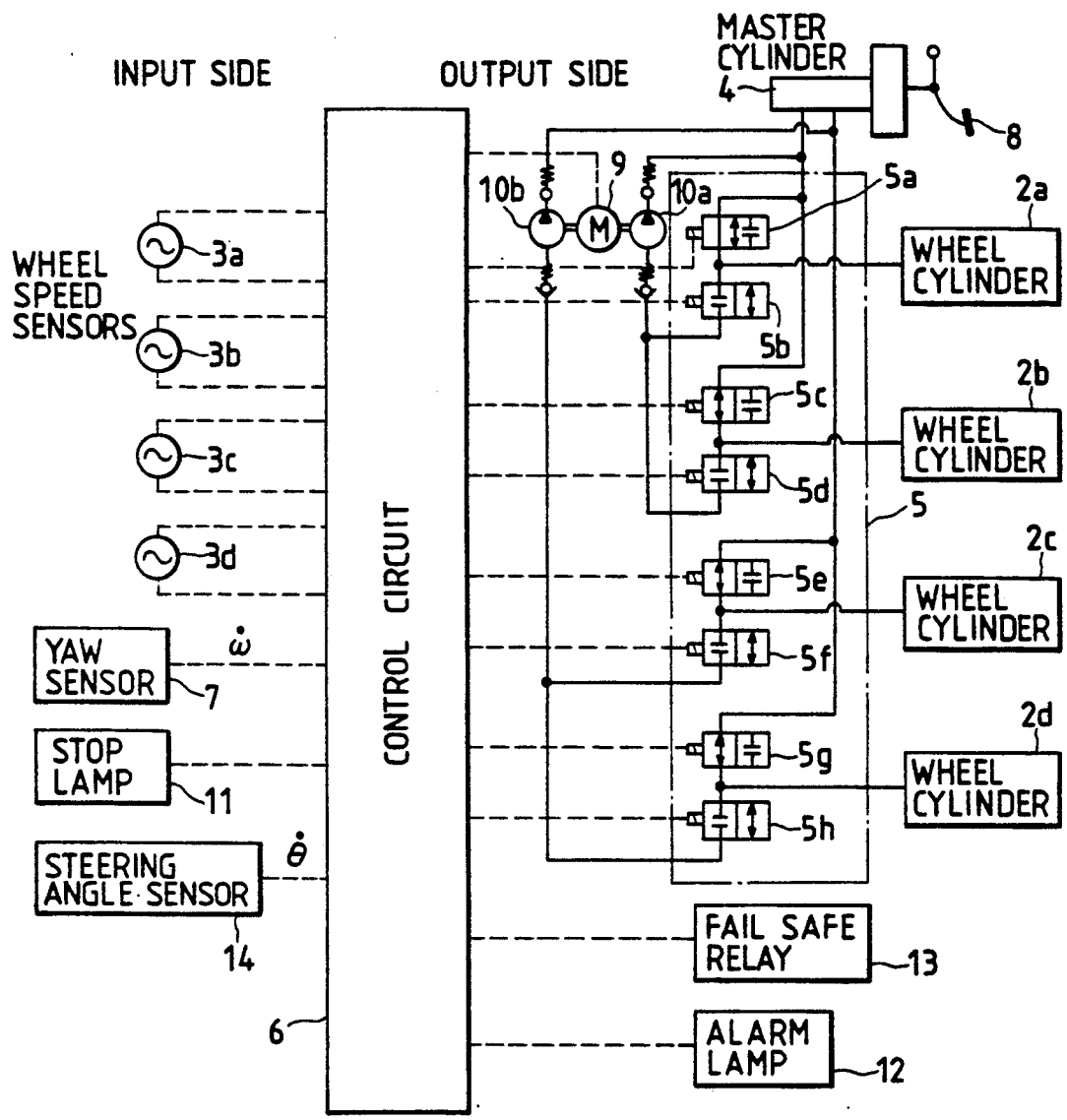
FIG. 2 is a diagram for explaining an input and output relationship of the control circuit incorporated in the embodiment shown in FIG. 1.

Now, the pressure control of the fluid for the respective wheel brake cylinders $2a \sim 2d$ explained more specifically with reference to FIG. 2. In the pressure oil unit 5, solenoid valves $5a \sim 5h$, which perform charge, hold and discharge operations of the pressure fluid to be transmitted to the respective wheel cylinders $2a \sim 2d$, are arranged and actuated upon receipt of driving signals from the control circuit 6. These solenoid valves $5a \sim 5h$ are respectively on/off valves and a respective set of two solenoid valves controls the pressure fluid for each of the respective wheel cylinders. The oil passages of the solenoid valves $5a$, $5c$, $5e$ and $5g$ are interrupted when the currents thereto are turned on by the driving signals and opened when the currents thereto are turned off. On the contrary, the oil passages of the solenoid valves $5b$, $5d$, $5f$ and $5h$ are made when the currents thereto are turned on by the driving signals and interrupted when the currents thereto are turned off. When no currents are supplied both to the solenoid valves $5a$ and $5b$, the oil passage of the solenoid valve $5a$ is opened and that of the solenoid valve $5b$ is interrupted, such that the pressure fluid in the wheel cylinder $2a$ is communicated to the master cylinder 4, thereby the pressure fluid in the master cylinder 4 is transmitted to the wheel cylinder $2a$, which condition is called as a pressure increase mode.

On the other hand, when a current is supplied to the solenoid valve $5a$, the oil passage with the master cylinder 4 is interrupted and the pressure fluid in the wheel cylinder $2a$ is held, which condition is called a pressure hold mode.

Further, when currents are supplied to both the solenoid valves $5a$ and $5b$, the oil passage of the solenoid valve $5a$ is kept in its interrupted condition and the oil passage of the solenoid valve $5b$ is opened. At this instance, the pressure fluid in the wheel cylinder $2a$ flows through the solenoid valve $5b$ and is discharged through a pump $10a$ which is adapted to be driven by a motor 9, which condition is called a pressure decrease mode. The motor 9 is driven by a signal from the control circuit 6 during actuation of the ABS control and drives the pumps $10a$ and $10b$ coupled thereto to discharge the pressure fluid in the wheel cylinder $2a$ to the master cylinder 4. The pressure fluid in the other wheel cylinders $2b$, $2c$ and $2d$ is controlled in the same manner as explained above in connection with the wheel cylinder $2a$.

Hereinbelow, the ABS control operation which transmits pressure decrease, pressure hold and pressure increase signals to the oil pressure unit 5 is explained with reference to FIG. 2 and FIG. 8.

When determining the respective wheel velocities which are obtained by the respective wheel speed sensors $3a$, $3b$, $3c$ and $3d$ constituted by devices, such as tacho/generators, and the motor vehicle body speed as follows;

Vfr: Velocity of front right wheel
Vfl: Velocity of front left wheel
Vrr: Velocity of rear right wheel
Vrl: Velocity of rear left wheel
V : Velocity of motor vehicle body,
slip rates of the respective wheels are expressed as follows:

$$\text{Sfr} = (V - Vfr) / V : \text{Slip rate of front right wheel}$$
$$\text{Sfl} = (V - Vfl) / V : \text{Slip rate of front left wheel}$$
$$\text{Srr} = (V - Vrr) / V : \text{Slip rate of rear right wheel}$$
$$\text{Srl} = (V - Vrl) / V : \text{Slip rate of rear left wheel}$$

(1)

Figure 8:
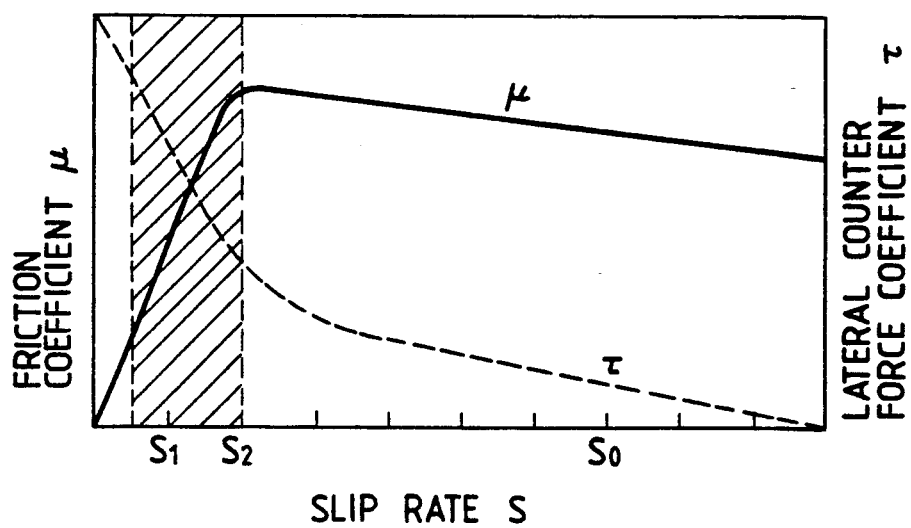
FIG. 8 is a diagram for explaining the principle of the present invention which shows μ-S and τ-S characteristic curves.

FIG. 8 shows relationships between slip rate S, and friction coefficient $\mu$ and lateral counter force coefficient $\tau$. The hatched portion in FIG. 8 is a region in which both the friction coefficient $\mu$ and the lateral counter force coefficient r show high values at the same time, in that when a slip rate is at around $0.1 \sim 0.2$, a large braking force and a large cornering force can be obtained. Therefore, ABS control devices are basically adapted to control the pressure of the braking fluid for the respective wheels in such a manner that the slip rates at the respective wheels show a value in the range around $0.1 \sim 0.2$. On the other hand, when the slip rates at the respective wheels which are obtained based on the above equations increase over the above range of which condition is induced by an excess reduction of the respective wheel velocities Vfr, Vfl, Vrr and Vrl detected by the speed sensors $3a \sim 3d$ for the respective wheels due to excess braking forces, in this instance the ABS control device acutuates the solenoid valves $5a \sim 5h$ to enter into the pressure decrease mode via the signals from the control circuit 6 and the pressure of the braking fluid is decreased to thereby reduce the slip rate. Further$\mu$ when the slip rates decreases below the above range, the increase of the respective wheel velocities Vfr, Vfl, Vrr and Vrl are suppressed by raising the pressure of the braking fluid via actuation of the solenoid valves $5a \sim 5h$ into the pressure increase mode, and the respective slip rates Sfr, Sfl, Srr and Srl are increased. In the manner as explained above, the ABS control device controls the slip rates via actuation of the solenoid valves $5a \sim 5h$ with the control circuit 6.

A signal from a stop lamp 11 is used as one of conditions to initiate the ABS control and is inputted into the control circuit 6. Further, the control circuit 6 may control an alarm lamp 12 which lights when the ABS control device is in an abnormal condition, and further controls a fail safe relay 13 which turns on/off the ABS control device dependent upon the extent of abnormal conditions thereof.

Figure 5:
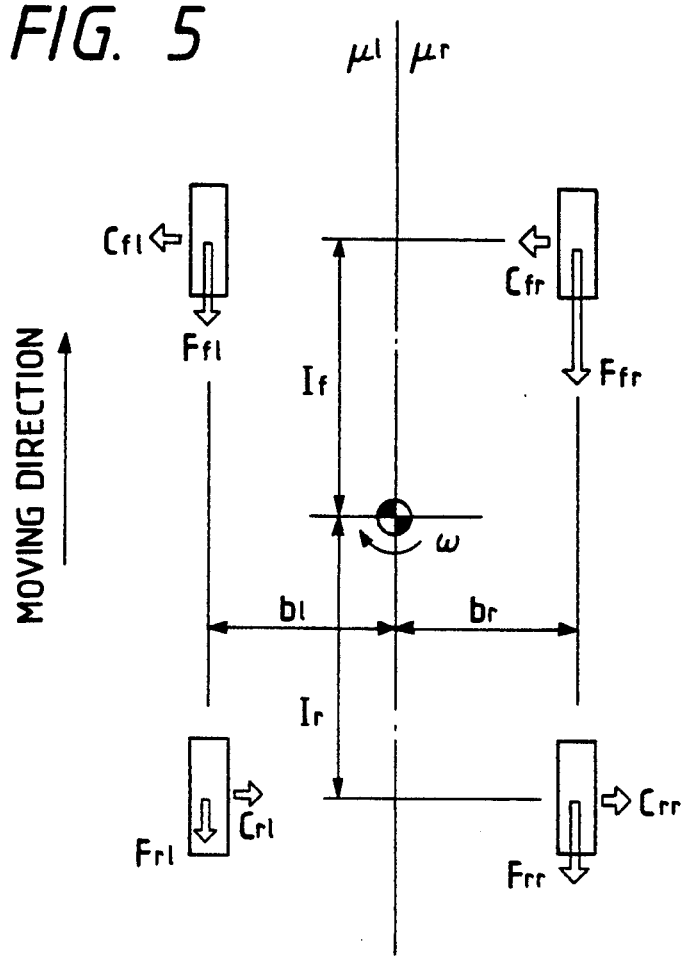
FIG. 5 is a diagram used for explaining the present invention which illustrates forces acting on the respective wheels of the motor vehicle and dimensions from the center line of the motor vehicle and from the center of gravity thereof to the respective wheels.

The above control by the ABS control device is satisfactory when the four wheels of the motor vehicle are running over a road surface having an equivalent condition, however, when the road surface condition is different, for example when the motor vehicle is running over a split μ road in which the road surface conditions at the right and left side wheels of the motor vehicle are extremely different, the above control is unsatisfactory with regard to locking the wheels of the motor vehicle, which is explained hereinbelow with reference to FIG. 5.

A first, when determining respective braking forces acting on the pespective wheels, that is:
Ffr: Braking force for front right wheel
Ffl: Braking force for front left wheel
Frr: Braking force for rear right wheel
Frl: Braking force for rear left wheel.
the braking forces Ffr, Ffl, Frr and Frl acting on the respective wheels are expressed as follows when there is no difference between right and left wheels with regard to vertical load Wf applied to the front wheels and vertical load Wr applied to the rear wheels and the road surface condition is equal for the right and left side wheels, in that the friction coefficients of the road surface (hereinbelow simply called as road surface μ) are also equal for the right and left side wheels:

$$Ffr = Ffl = \mu \cdot Wf \quad (2)$$

$$Frr = Frl = \mu \cdot Wr \quad (3)$$

In this instance, as will be apparent from the above equations (2) and (3), no braking force difference appears at the right and left side wheels of the motor vehicle and no forces acting on the motor vehicle in the lateral direction are generated, accordingly the directional stability of the motor vehicle is maintained.

In contrast to the above, when the road surface μs are different at the right and left sides of the motor vehicle, for example when the road surface μr of the right side is higher than the road surface μl of the left side, in that μr > μl, the following inequalities stand:

$$Ffr = \mu r \cdot Wf > Ffl = \mu l \cdot Wf \quad (4)$$

$$Frr = \mu r \sim Wr > Frl = \mu l \sim Wr \quad (5)$$

Namely, the braking forces Ffr and Frr acting on the right side wheels become larger, therefore the following moment Mb causing to rotate the motor vehicle to rotate around the center of gravity thereof is generated;

$$Mb = br(Ffr + Frr) = bl(Ffl + Frl)$$

$$- lf(Cfr + Cfl) - lr(Crr + Crl) \quad (6)$$

wherein, as illustrated in FIG. 5,
br: Distance from motor vehicle center line to right side wheels
bl: Distance from motor vehicle center line to left side wheels
lf: Distance from motor vehicle center of gravity to front wheels
lr: Distance from motor vehicle center of gravity to rear wheels
Cfr: Cornering force of front right wheel
Cfl: Cornering force of front left wheel
Crr: Cornering force rear right wheel
Crl: Cornering force of rear left wheel.
The above cornering forces are reaction forces which are generated when the wheels tend to slip in a lateral direction and are determined by multiplying a predetermined value, in that a vertical load is acting on the wheels, with a lateral counter force coefficient τ as shown in FIG. 8.

When there is a small difference between road surface μ at the right and left sides of the motor vehicle, the braking force difference acting on the right and left side wheels is also small, such that the following inequality stands;

$$Br(Ffr + Frr) - bl(Ffl + Frl) < lf(Cfr + Cfl) + lr(Crr + Crl) \quad (7)$$

Namely, the moment generated by the braking force difference between the right and left side wheels is canceled out by the cornering forces generated by the respective wheel tires so that there is no moment causing the motor vehicle to rotate around the vertical axis at the center of gravity thereof, in that no yawing, is generated.

However, when the difference of the road surface μs at the right and left side wheels becomes larger, the following inequality stands;

$$Br(Ffr + Frr) - bl(Ffl + Frl) > lf(Cfr + Cfl) + lr(Crr + Cvl) \quad (8)$$

As will be apparent from the above inequality, the generated yawing can not be canceled out by the cornering force generated by the respective wheel tires.

Such yawing is not caused through the handling of the steering wheel by the driver of the motor vehicle, but is caused by the road surface condition, more specifically the difference of road surface μs at the right and left side wheels, in that the yawing is caused against the intention of the driver so that a sudden generation of yawing possibly causes a spinning of the motor vehicle.

Accordingly, in the present invention based upon detection of yawing generated by a braking force difference between the right and left side wheels, target slip rates for the right and left side wheels are modified so as to eliminate the braking force difference between at the right and left side wheels to thereby positively suppress the generated yawing.

Hereinbelow, the operation of the control circuit 6 is explained more specifically in which the target slip rates for the respective wheels are modified with reference to FIG. 3 (a), FIG. 3 (b) and FIG. 4.

Figure 4:
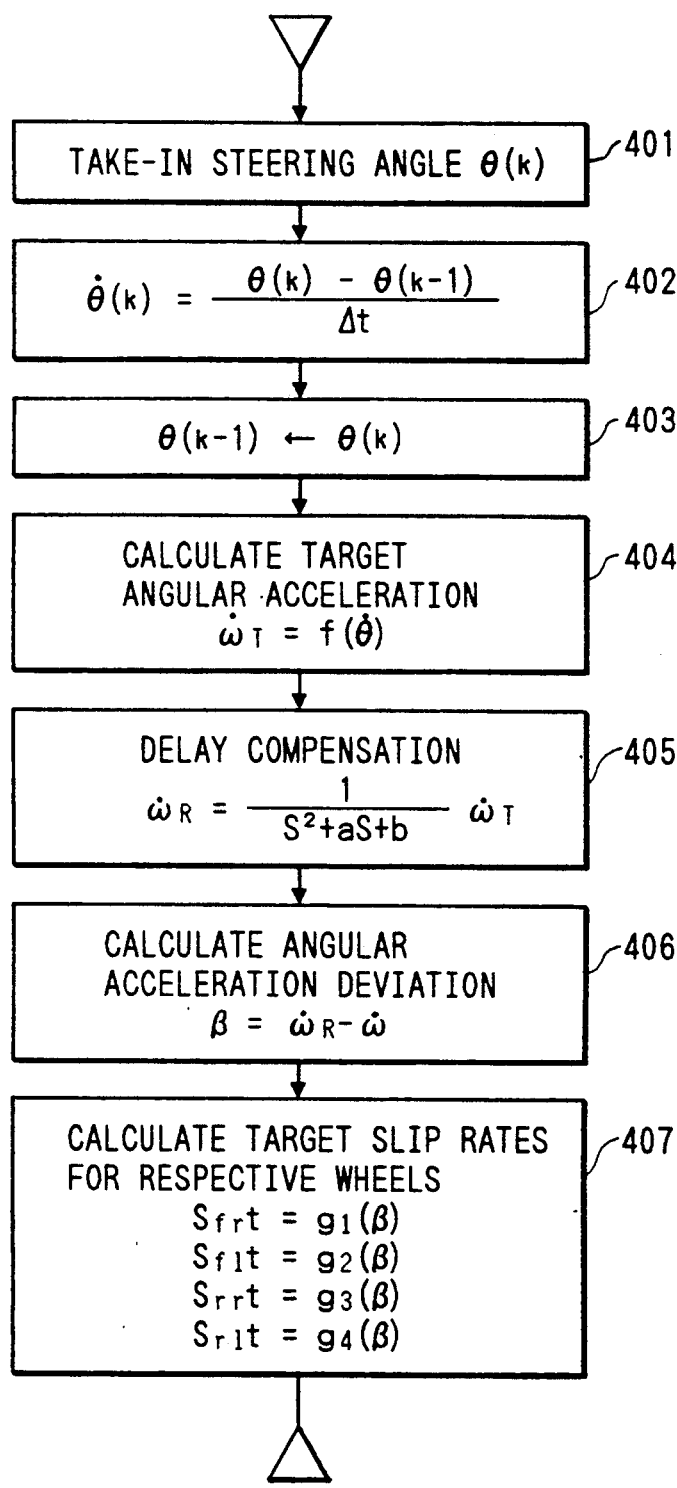
FIG. 4 is a flowchart for calculation of target slip rates for respective wheels according to the present invention.

First of all, in step 401 in FIG. 4 a signal θ (k) is taken-in from the steering wheel steering angle sensor 14 and the signal taken-in is differentiated in step 402 to obtain a steering angle speed, and in step 403 the data taken-in is shifted for use in the subsequent calculation.

Subsequently, in step 404 a target yaw angular acceleration $\dot{\omega}_T$ is calculated. For the calculation of the target yaw angular accelerating $\dot{\omega}_T$ a map contained in a control block 301 in FIG. 3 is used wherein a target yaw angular acceleration $\dot{\omega}_T$ is calculated in proportion to a steering wheel steering angle speed $\dot{\theta}$ and in the map upper limits of the target yaw angular acceleration are set for the steering toward the right and left directions. Namely, in step 404, in other words in the processing in the control block 301, when the steering wheel is turned toward the right direction a yaw angular acceleration toward the right direction in proportion to the steering angle speed is calculated as the target yaw angular acceleration, and when the steering wheel is turned toward the left direction, a yaw angular acceleration toward the left direction in proportion to the steering angle speed is calculated as the target yaw angular acceleration.

Figure 3A:
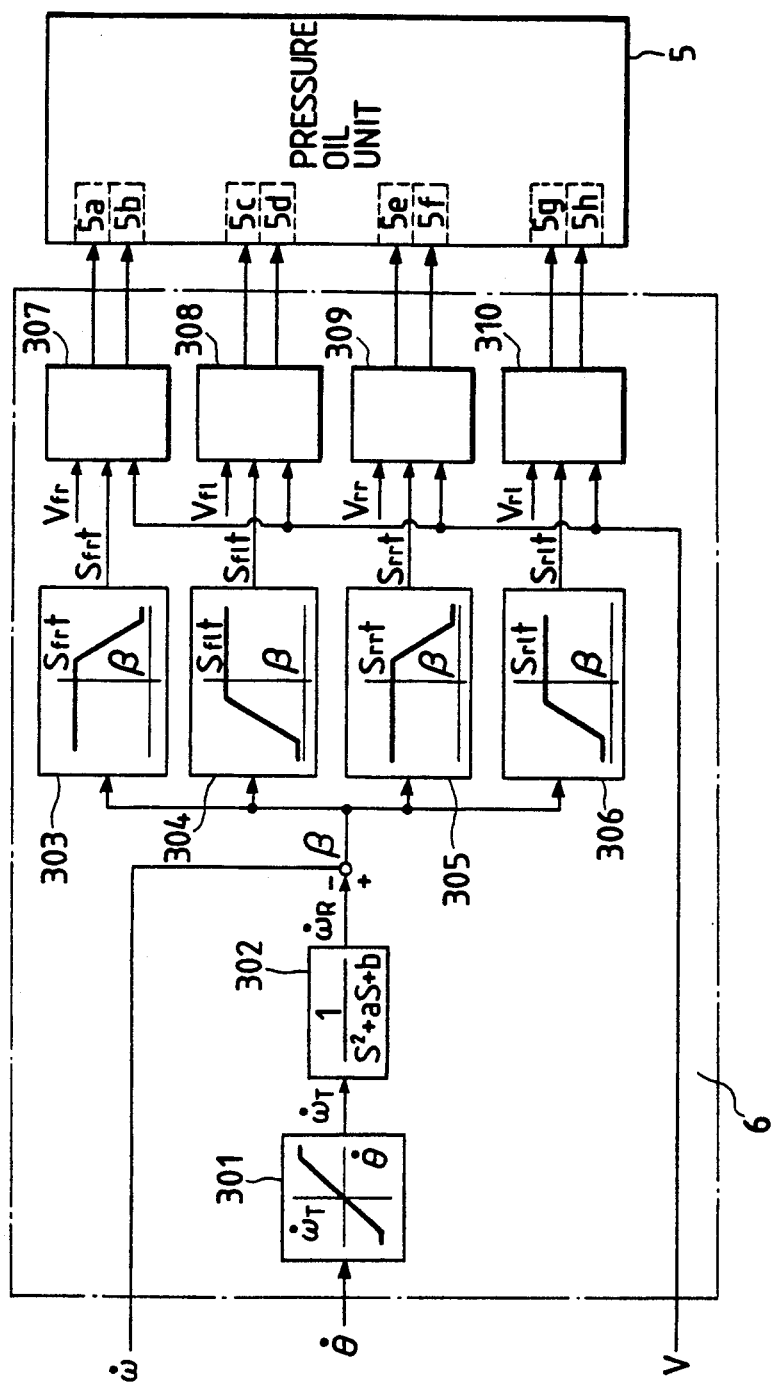
FIG. 3 (*a*) is a block diagram of the control circuit shown in FIG. 2.
Figure 3B:
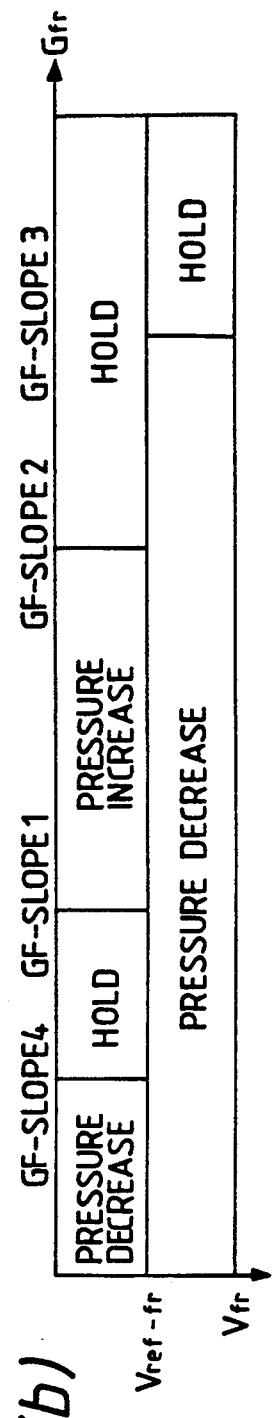

However, in an actual motor vehicle the yaw angular acceleration is never generated immediately after the steering wheel is turned, therefore a delay factor such as a secondary delay factor is applied to the target yaw angular acceleration $\omega_T$ as indicated in step 405 in FIG. 4 and at a control block 302 in FIG. 3 (a) to obtain a delay compensated target yaw angular acceleration $\omega R$.

In step 406, a yaw angular acceleration deviation $\beta$ is obtained by subtracting the detected yaw angular acceleration $\omega$ from the delay compensated target yaw angular acceleration $\omega R$ obtained in step 405, Subsequently, in step 407 target slip rates for the respective wheels are calculated according to maps contained in control blocks 303~306 in FIG. 3 (a) in which the target slip rates Sfrt, Sflt, Srrt and Srlt for the respective wheels are obtained dependent upon the respective yaw angular acceleration deviation $\beta$ or, in case when there is no delay compensated target yaw angular acceleration $\omega R$, dependent upon the detected yaw angular acceleration $\omega$.

After determining the respective target slip rates Sfrt, Sflt, Srrt and Srlt for the respective wheels, the control modes for the sets of solenoid valves are determined in respective control blocks 307~310 depending upon the determined respective target slip rates. FIG. 3 (b) is a map contained in the control block 307 for controlling the set of solenoid valves 5a and 5b which controls the front right wheel into one of the pressure decrease mode, pressure hold mode and pressure increase mode depending upon wheel deceleration and acceleration Gfr and target wheel velocity Vref−fr. GF-SLOPE 1, ~GF-SLOPE 4 in abscissa of the map are predetermined values and GF-SLOPE 4 and GF-SLOPE 1 are respectively predetermined negative values representing decelerations, and GF-SLOPE 2 and GF-SLOPE 3 are respectively predetermined positive values representing accelerations. The target wheel velocity Vref−fr in ordinate of the map is calculated by the following equation using the determined target slip rate Sfrt for the front right wheel;

$$Vref-Fr = (1 - Sfrt) V \quad (9)$$

The control blocks 308~310 contain similar maps as in the control block 307 and operate in the same manner as the control block 307.

Now, the importance of modifying the target slip rate is explained in detail hereinbelow. When the friction coefficient $\mu$ in the $\mu$−s characteristic as illustrated in FIG. 8 shows the maximum value, in that at the slip rate $S_2$, the braking force acting on the wheel is also maximized, therefore an ABS control device usually controls the slip rate at around this area. When the slip rate S is reduced, the friction coefficient $\mu$ also reduces accordingly, therefore the braking force also reduces. However, in contrast thereto, the lateral counter force coefficient $\tau$ increases, as a result, the cornering force is increased. Now, assuming that the road surface $\mu$ at the right side of the motor vehicle is higher than that at the left side thereof as illustrated in FIG. 5, the braking forces at the right side wheels increase in the conventional ABS control, therefore a yaw moment which causes the motor vehicle to rotate in the clockwise direction as shown by an arrow is generated on the motor vehicle. At this moment, if the target slip rates for the right side wheels are reduced, the braking forces acting on the right side wheels are reduced so that the yaw moment toward the clockwise direction is possibly suppressed.

As a result of the above, a spin of the motor vehicle is suppressed even under a condition where the road surface $\mu$s at right and left sides of the motor vehicle differ such that a stability of the motor vehicle is obtained.

However, with the above control, although the stability of the motor vehicle is obtained, the braking distance of the motor vehicle is prolonged due to the reduction of the braking forces. Accordingly, in the present invention, the conditions for reducing the target slip rates are varied depending upon whether the stability of the motor vehicle or the braking force thereof is the most significant.

Figure 6:
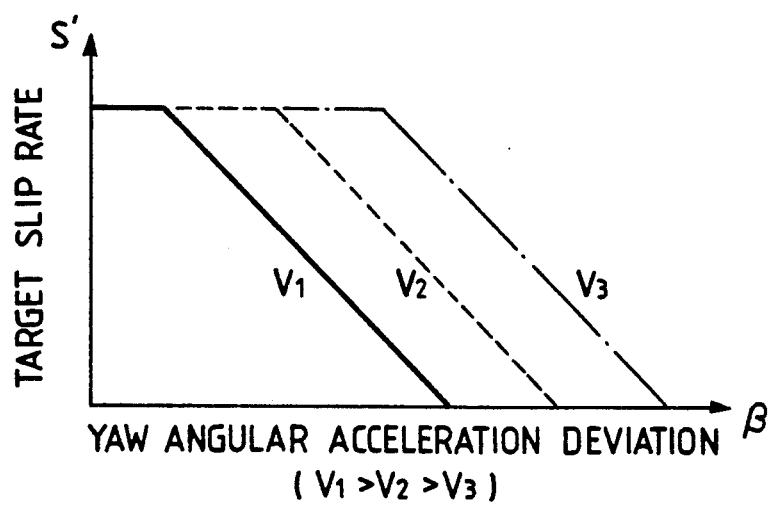
FIG. 6 is a target slip rate setting map 1 used in the present invention.

For achieving the above control, set values of target slip rate S' are varied by making use of the motor vehicle body velocity as a parameter as shown in FIG. 6. Namely, when a motor vehicle is running at a high speed and a yaw moment is generated, a spin of the motor vehicle may lead to a serious accident; therefore, a reduction of the target slip rate S' is started from a small yaw angular acceleration deviation $\beta$ to thereby reduce the braking force difference between at right and left side wheels and to obtain sufficient cornering forces in order to achieve a control which places importance on the stability of the motor vehicle. On the other hand, when the motor vehicle body velocity reduces, a certain amount of yaw moment can be modified by handling the steering wheel, so that set values of the target slip rate S' are maintained high up to a large yaw angular acceleration deviation in order to achieve a control which places a priority on the braking force for shortening the braking distance. Thereby a reliable ABS control is realized for all running conditions while achieving a desired stability thereof without prolonging the braking distance. Further, in FIG. 6 although only three maps corresponding to three motor vehicle body velocities $V_1$, $V_2$ and $V_3$ are illustrated, the number of maps dependent upon parameters of the motor vehicle body velocities can be increased to achieve a more fine control or values between maps can be determined via a linear interpolation.

Figure 7:
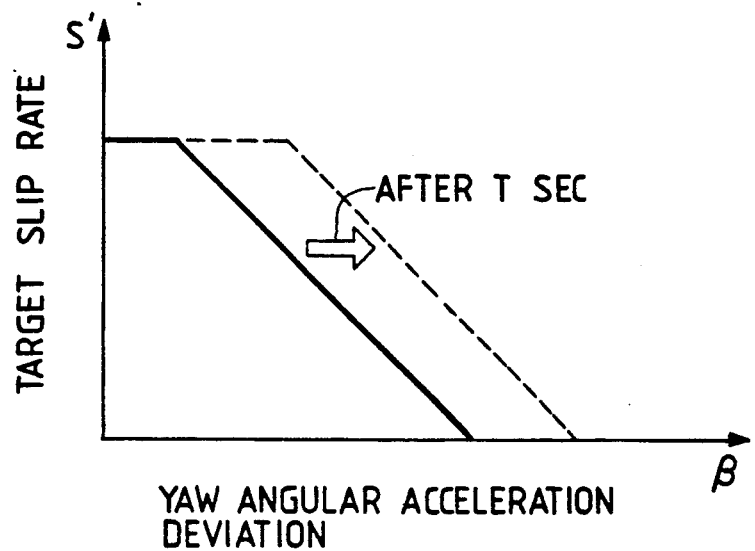
FIG. 7 is a target slip rate setting map 2 used in the present invention.

FIG. 7 shows another map for determining target slip rate S' dependent upon yaw angular acceleration deviation $\beta$ in which two maps for a predetermined motor vehicle body velocity are used. Once a yaw moment is generated on the motor vehicle, a map in which target slip rates S' are set low even from a small yaw angular acceleration deviation $\beta$ is used for achieving the control which placed an importance on the stability of motor vehicle, and after a predetermined time T has passed, the control is passed to another map in which target slip rates S' are set high up to a comparatively high yaw angular acceleration deviation $\beta$ for achieving the control which places an importance on the braking distance of the motor vehicle. With the map as shown in FIG. 7, spinning of the motor vehicle can be prevented by suppressing an initial yaw moment without excessively relying upon the driver's handling of the steering wheel, and as the braking distance can be shortened as well. In the modified map shown in FIG. 7, the mapped values of the target slip rate S' do not need to change suddenly after the predetermined time T second has passed; rather the mapped values thereof can be gradually changed during the time T second via a linear interpolation.

In the above embodiment, an ABS control incorporating the means detectable of yaw moment generated on the motor vehicle, in the form of the yaw detector 7 in FIG. 1; is explained, however, the present invention is also applicable to an ABS control having no means for detecting yaw moment wherein, instead of detecting the yaw moment, the detected wheel velocity is differentiated to calculate the deceleration of the wheel and based upon the calculated deceleration, the road surface $\mu$ is estimated, and then a target slip rate at the high $\mu$ side which causes an increase in the braking force is lowered to reduce the braking force even when the target slip rates for both sides are equal, thereby a yaw moment which is possibly caused on the motor vehicle is suppressed.

As will be apparent from the above detailed explanation on the present invention, according to the present invention a stability of a motor vehicle is achieved as well as the braking distance thereof is shortened even under a condition where the road surface conditions at right and left sides of the motor vehicle differ without causing a spin of the motor vehicle.

We claim:

1. An anti-skid brake control device comprising,
   means for detecting the respective velocities of a plurality of wheels of a motor vehicle;
   means for detecting yaw angular acceleration of the motor vehicle;
   means for detecting steering angle speed of a steering wheel of the motor vehicle to determine a target yaw angular acceleration;
   target slip rate setting means for setting target slip rates individually for the respective wheels based upon the detected yaw angular acceleration and the determined target yaw angular acceleration, said target slip rate setting means including means for varying the set value of the target slip rate dependent upon at least one of a value of motor vehicle body velocity and a predetermined lapse of time after a yaw moment is generated; and
   means for controlling pressures of braking fluid for the respective wheels so as to follow slip rates of the respective wheels determined on the basis of the respective wheel velocities detected by said wheel velocity detecting means and the varied set target slip rates for the respective wheels.

2. An anti-skid brake control device comprising,
   means for detecting the respective velocities of a plurality of wheels of a motor vehicle;
   means for detecting yaw angular acceleration of the motor vehicle;
   means for determining target slip rates for the right and left side wheels independently based upon a steering angle signal of the motor vehicle and for correcting the determined target slip rates on the basis of the detected yaw angular acceleration; and
   means for controlling braking pressures of the braking fluid for the respective wheels so as to follow slip rates of the respective wheels determined on the basis of the wheel velocities detected by said wheel velocity detecting means and the corrected target slip rates.

3. An anti-skid brake control device comprising:
   first means for determining a target yaw angular acceleration $\omega T$ based upon a steering angle speed $\theta$ of a steering wheel of a motor vehicle;
   second means for compensating the target yaw angular acceleration $\omega T$ by applying a delay factor in the system of the device to obtain a compensated target yaw angular acceleration $\omega R$;
   third means for detecting yaw angular acceleration $\omega$ of the motor vehicle;
   fourth means for determining a yaw angular acceleration deviation $\delta$ by subtracting the detected yaw angular acceleration $\omega$ from the compensated target yaw angular acceleration $\omega R$;
   fifth means for determining target slip rates Sfrt, Sflt, Srrt and Srlt for the respective wheels based upon the yaw angular acceleration deviation $\delta$; and
   sixth means for controlling pressures of braking fluid for the respective wheels in such a manner that slip rates of the respective wheels determined by the respective wheel velocities and motor vehicle body velocity follow the target slip rates for the respective wheels, wherein said fifth means includes a plurality of maps for determining the target slip rate for each of the respective wheels, which maps are selectable dependent upon at least one of a value of motor vehicle body velocity and a predetermined lapse of time after a yaw moment is generated, so that both stability of the motor vehicle and reduction in braking distance are safely obtained.

* * * * *